United States Patent [19]

Sato et al.

[11] Patent Number: 5,587,815
[45] Date of Patent: Dec. 24, 1996

[54] PHASE MODULATION HOLOGRAPHIC DEVICE FOR GENERATING TWO DIFFERENT WAVEFRONTS

[75] Inventors: Akira Sato, Amagasaki; Takuji Hatano, Sakai, both of Japan

[73] Assignee: Minolta Camera Kabushiki Kaisha, Osaka, Japan

[21] Appl. No.: 122,372

[22] Filed: Sep. 15, 1993

[30] Foreign Application Priority Data

Sep. 17, 1992 [JP] Japan .................................. 4-247424

[51] Int. Cl.$^6$ .................................................. G03H 1/12
[52] U.S. Cl. .................. 359/11; 359/15; 359/19; 359/569
[58] Field of Search ........................ 359/1, 15, 566, 359/569, 571, 573, 575, 11, 19, 742, 565

[56] References Cited

U.S. PATENT DOCUMENTS

| | | | |
|---|---|---|---|
| 4,881,805 | 11/1989 | Cohen | 359/571 |
| 4,936,666 | 6/1990 | Futhey | 359/566 |
| 5,218,471 | 6/1993 | Swanson et al. | 359/569 |
| 5,227,915 | 7/1993 | Grossinger et al. | 359/575 |
| 5,276,551 | 1/1994 | Nakagawa | 359/571 |

*Primary Examiner*—Frank González
*Assistant Examiner*—Robert Kim
*Attorney, Agent, or Firm*—Price, Gess & Ubell

[57] ABSTRACT

A phase modulating device for spatially modulating a phase of an incident light beam is of a binary type having a plurality of rectangular protrusions on a cross section thereof. A distribution is provided to a diffraction efficiency at each point of the phase modulating device by varying a width of each protrusion.

13 Claims, 7 Drawing Sheets

$h = \lambda / (n-1)$

PHASE MODULATION HOLOGRAPHIC DEVICE FOR GENERATING TWO DIFFERENT WAVEFRONTS

BACKGROUND OF THE INVENTION

1. Field of the Invention

The present invention relates to a phase modulation holographic device for use in a multi focal length holographic lens system and a holographic coupler.

Particularly, the present invention can be employed as a zone plate for simultaneously generating a plurality of wave-fronts in a shape measuring apparatus as described in Japanese Patent Application H4-168825 of the present Applicants.

2. Description of the Prior Art

As shown in FIG. 1, a typical holographic device 3 is constituted by a phase modulation holographic device 2 and an amplitude modulation holographic device 1. As the phase modulation holographic device 2, a phase plate called a kinoform has been known. This is a holographic device for providing to a plane wave a phase modulation which is necessary for reconstituting an arbitrary image. For example, by providing saw-toothed convex portions 2a as shown in FIG. 1, an uneven surface is formed with which the phase modulation is performed.

The amplitude modulation holographic device 1 is a plate-like device where portions 1a having a small intensity distribution and through which it is difficult for light to pass and portions 1b having a large intensity distribution and through which it is easy for light to pass are alternately arranged. The amplitude modulation holographic device 1 and the phase modulation holographic device 2 are joined together to form one optical device (i.e. the holographic device 3).

The amplitude modulation holographic device 1 and the phase modulation holographic device 2 can easily be produced. However, since highly accurate positioning is required in the process of joining the two devices, various problems are presented such as difficulty in the joining of the two devices, insufficient precision and high cost.

SUMMARY OF THE INVENTION

An object of the present invention is to provide a phase modulation holographic device where the above problems have been solved.

To achieve the above-mentioned object, according to the present invention, in a phase modulating device for spatially modulating a phase of an incident light beam, a distribution is provided to a diffraction efficiency at each point of said phase modulating device.

According to such a feature, the phase modulation holographic device is provided with a diffraction efficiency distribution as well as a phase distribution. As a result, the electromagnetic field after the diffraction is provided with not only a phase distribution but also an amplitude distribution in accordance with the diffraction efficiency distribution, whereby a plurality of desired wavefronts can be obtained. Further, with the arrangement of the phase modulation holographic device where not only a phase distribution but also an amplitude distribution is provided, it is unnecessary to attach an amplitude modulation holographic device.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

First Embodiment

Figure 2:
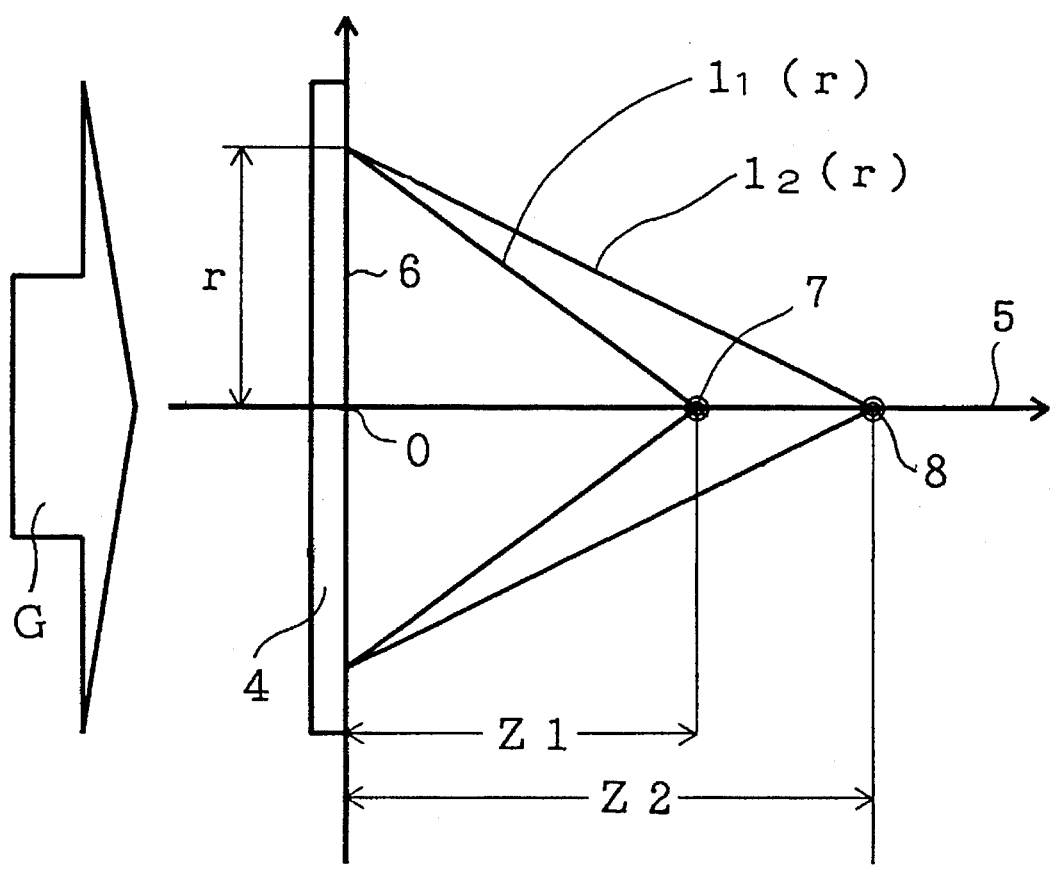
FIG. 2 is a conceptional view of a dual focal length holographic device embodying the present invention.
Figure 3:
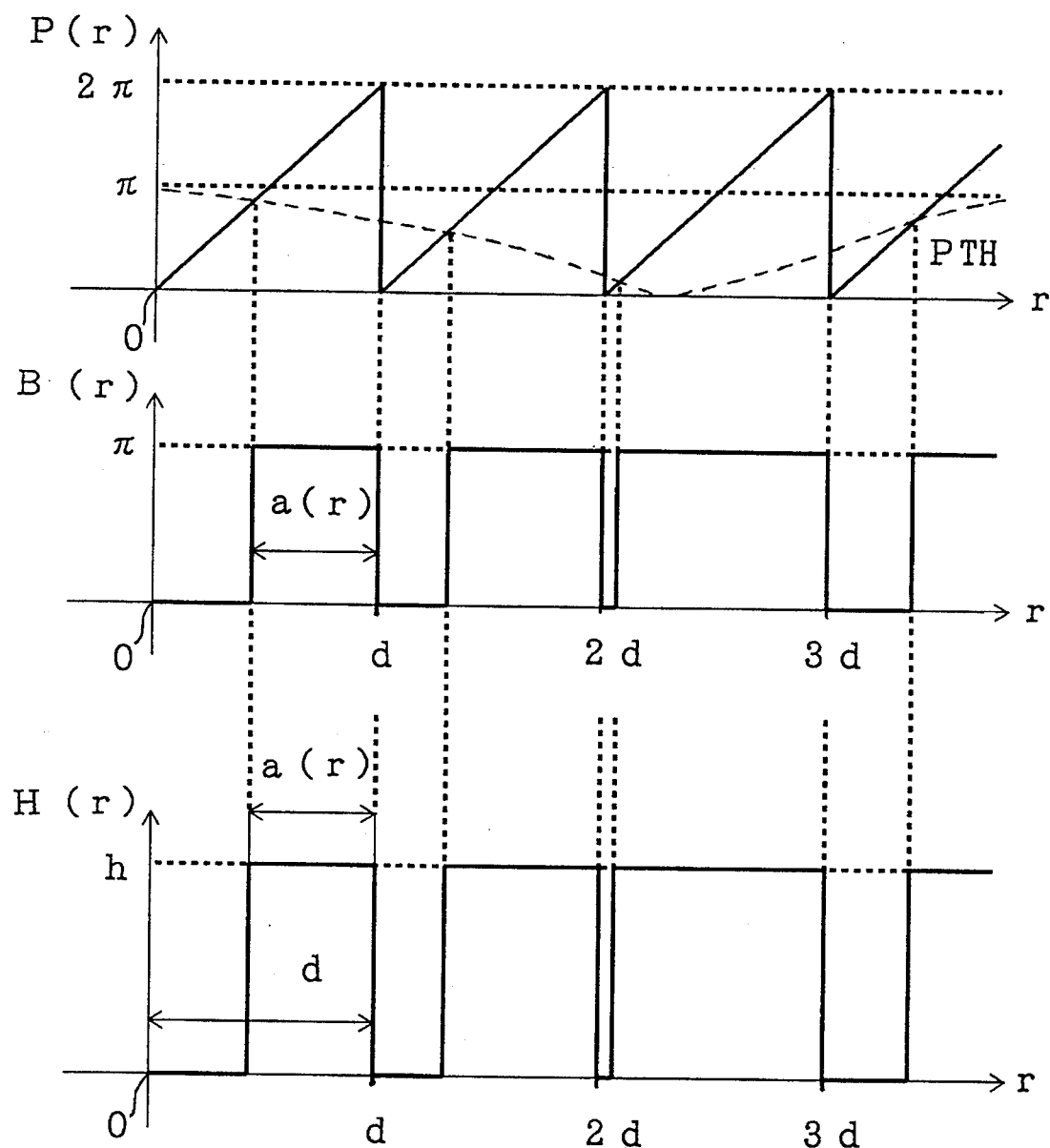
FIG. 3 is a view showing a cross-sectional configuration and phase distributions of a binary phase holographic device embodying the present invention.

FIG. 2 is a conceptional view of a dual focal length holographic device embodying the present invention. FIG. 3 shows an H(r)-r graph showing a surface configuration, a phase difference distribution P(r) and a phase difference distribution B(r), which is a binarized P(r), of a binary phase holographic device embodying the present invention. The H(r)-r graph of FIG. 3 represents a surface configuration of a binary phase holographic device where a diffraction grating is formed in which the height of convex portions is set to be a height h so that the phase difference between light passing through the convex portions and light passing through concave portions is $\pi$, and where the pitch and the upper surface width of the convex portions are set to be a pitch d and a width a(r), respectively, calculated in advance so that the binarized phase difference distribution B(r) is realized. The calculation method of the height h and the upper surface width a will be described later.

A method will be described of producing a dual focal length lens system constituted by the binary phase holographic device embodying the present invention, i.e. a binary phase zone plate 4 having focal lengths Z1 and Z2 in FIG. 2.

An optical axis 5 is taken so as to be perpendicular to the zone plate 4. It is assumed that positions 7 and 8 at each of which a point light source which emits coherent light having a wavelength $\lambda$ is to be placed are located at positions on the optical axis 5 which are distances Z1 and Z2 away from the zone plate 4, respectively. When an intersection of the optical axis 5 and the zone plate 4 is an original point 0 and a coordinate r is taken on the zone plate 4 along the diameter (in a direction 6), a complex amplitude distribution H(r) of an electromagnetic field formed by superposition of wavefronts of both of the two coherent light rays emitted from the point light sources placed at the positions 7 and 8 is obtained by $$H(r) = A1\exp[i \cdot k \cdot l_1(r)] + A2\exp[i \cdot k \cdot l_2(r)] \quad (1)$$

where $$l_1(r) = \sqrt{Z_1^2 + r^2} \quad (2)$$

$$l_2(r) = \sqrt{Z_2^2 + r^2} \quad (3)$$

$$k = \frac{2\pi}{\lambda} \quad (4)$$

$$i^2 = -1$$

Here, A1 and A2 can be given as constants since they are variables which are dependent on the light intensities of the point light sources placed at the positions 7 and 8. When the intensities of light rays emitted from the point light sources placed at the points 7 and 8 located at coordinates Z1 and Z2 on the optical axis 5 are approximately the same, A1 and A2 are set to be A1=A2=A, and the expression (1) can further be simplified.

When a function to give a phase component of the complex amplitude is represented by Arg[ ], the phase distribution P(r) and the intensity distribution I(r) of the complex amplitude to be reconstituted on the zone plate 4 is calculated by $$P(r) = \text{Arg}[H(r)] \quad (5)$$

$$I(r) = H(r)H^*(r) \quad (6)$$

where H*(r) is a conjugate complex amplitude distribution function of H(r).

When, in order to reconstitute holographic images at the positions 7 and 8, a luminous flux G is incident from the opposite side of the positions 7 and 8 as a plane wave advancing perpendicularly to the zone plate 4, P(r) can be considered to be a phase difference distribution which is dependent on a distance r from the original point 0 along the zone plate 4. Further, when Imax is the maximum value of I(r), I(r)/Imax means a transmission distribution which is dependent on the distance r from the original point 0 along the zone plate 4.

When a threshold value for binarization is given by PTH (0<PTH<2π), B(r) which is a binarized P(r) is expressed as $$B(r) = \pi (PTH \leq P(r) < 2\pi) \quad (7)a$$

or as $$B(r) = 0 (0 \leq P(r) < PTH) \quad (7)b$$

Figure 6A:
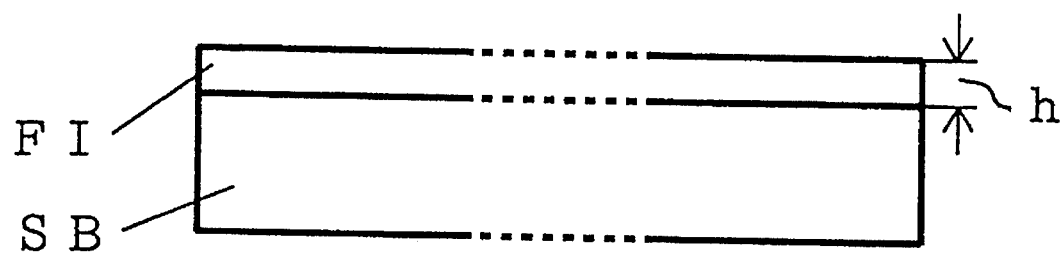
FIGS. 6A and 6B are cross-sectional views of the binary phase holographic device embodying the present invention.
Figure 6B:
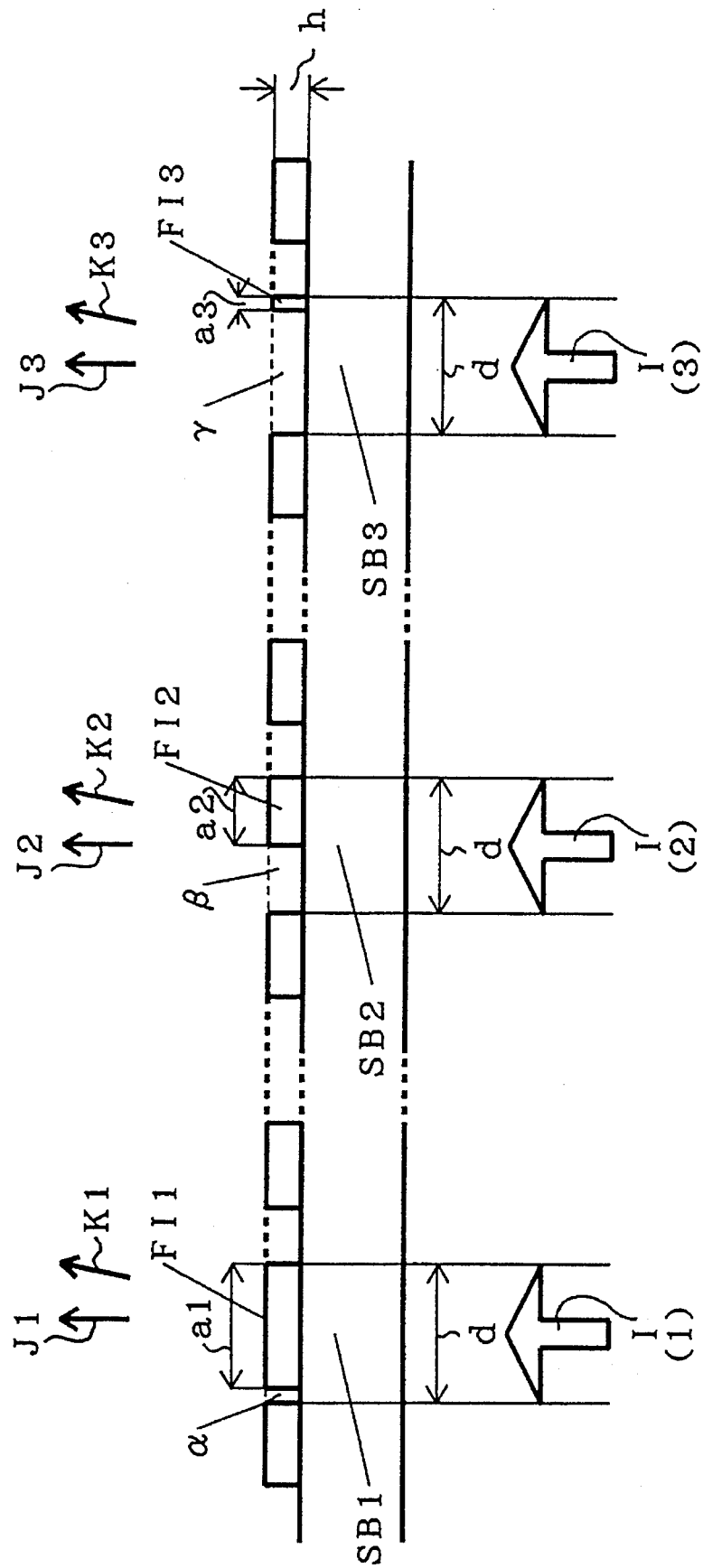

FIGS. 6A and 6B are cross-sectional views of the binary holographic device embodying the present invention. With these figures, the reason why the binarized phase difference distribution B(r) and the intensity distribution I(r) are simultaneously realized will be described.

As shown in FIG. 6A, a resist film FI having a refractive index n is uniformly applied on a glass plate SB.

At this time, in order to shift by π the phase difference between diffracted light having passed through the convex portions and diffracted light having passed through the concave portions, the resist film FI is formed to have a thickness h which is calculated in advance by $$h = \frac{\lambda}{n-1} \quad (8)$$

The uneven surface is easily made by drawing a pattern with an electron beam or a laser beam and developing it so that portions α, β and γ of the resist film FI where B(r)=0 are removed to form concave portions. As a result, the binarized phase difference distribution B(r) and the intensity distribution I(r) are realized with the uneven surface serving as a diffraction grating.

Luminous fluxes having an intensity I are incident on the pitch d at portions (1), (2) and (3) and transmitted. After diffraction, zero-order diffracted light rays having intensities J1, J2 and J3, respectively, and first-order diffracted light rays having intensities K1, K2 and K3, respectively, are outputted. At this time, it is assumed that at the portion (1)

$$\frac{d}{2} < a1 < d \quad (9)$$

at the portion (2)

$$\frac{d}{2} = a2 \quad (10)$$

and at the portion (3)

$$0 < a3 < \frac{d}{2} \quad (11)$$

where a1, a2 and a3 are upper surface widths of the convex portions formed in resist films FI1, FI2 and FI2 applied onto glass plates SB1, SB2 and SB3 at the portions (1), (2) and (3), respectively.

The diffraction efficiencies at the portions (1), (2) and (3) are given by K1/I, K2/I and K3/I, respectively. As described later (expression (12)), at the portion (2) where the expression (10) holds, the diffraction efficiency thereof given by K2/I is the maximum. At the other portions (1) and (3) where the expressions (9) and (11) hold, respectively, the larger the difference between a and d/2 is, the smaller the diffraction efficiency is. Thus, the intensity distribution I(r) of the diffracted light ray at the portion (2) is larger than the intensity distributions I(r) of the diffracted light rays at the portions (1) and (3).

Figure 1:
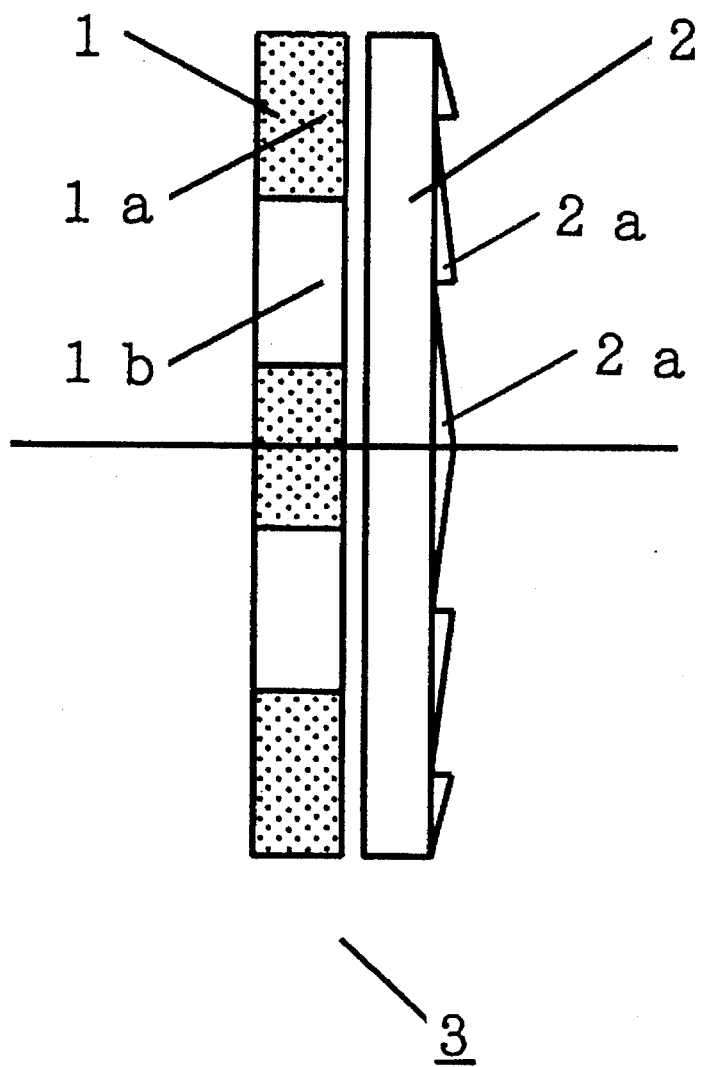
FIG. 1 is a view showing a conventional multi focal length holographic device constituted by an amplitude modulation holographic device and a phase modulation holographic device.

That is, the portions (1) and (3) perform the function of the portions la of the conventional amplitude modulation holographic device 1 of FIG. 1 having a small amplitude distribution, while the portion (2) performs the function of the portions lb having a large amplitude distribution. Thus, with this binary holography, it is possible to omit the high-cost, difficult process of joining the amplitude modulation holographic device 1 and the phase modulation holographic device 2.

Subsequently, it will be specifically described that in the binary phase holography of FIGS. 6A and 6B, a desired binarized phase difference distribution B(r) and intensity distribution I(r) can simultaneously be realized by forming the convex portions in each pitch d so as to have an upper surface width a and a height h which are calculated in advance.

First, in order to realize a diffraction efficiency distribution η(r), the surface configuration of the binary phase holographic device is calculated in the following manner.

With respect to the diffraction efficiency distribution η(r) of a binary diffraction grating, when the pitch of the grating at a coordinate r is d(r)=d (i.e. the pitch is constant) and a(r) is a distribution of the upper surface width a of a concave portions formed in each pitch d of the diffraction grating located at a coordinate r which distribution is provided to determine the configuration of the convex portions for providing a phase difference $\pi$ to transmitted light, the following proportional expression holds:

$$\eta(r) = C\sin^2\left(\frac{\pi a(r)}{d}\right) \tag{12}$$

where C is a constant. That is, the diffraction efficiency $\eta(r)$ is the maximum when the upper surface width $a(r)$ of the convex portion is $d/2$, and the larger the difference between $a(r)$ and $d/2$ is, the smaller the diffraction efficiency $\eta(r)$ is. Substituting the expression (12) with C=1 with respect to $a(r)/d$, $$\frac{a(r)}{d} = \frac{\sin^{-1}\sqrt{\eta(r)}}{\pi} \tag{13}$$

That is, by forming the upper surface width $a(r)$ of the convex portion in each pitch d of the diffraction grating located at a coordinate r so as to have a width $a(r)$ fulfilling the expression (13), a desired diffraction efficiency distribution $\eta(r)$ can be realized at the coordinate r.

If the upper surface width $a(r)$ is given by the expression (13) at a part of the binary diffraction grating and the diffraction efficiency distribution $\eta(r)$ is applied to the binary diffraction grating, the same function will be achieved as that of the desired transmission distribution $I(r)/I_{max}$ provided to the amplitude modulation holographic device 1 of FIG. 1. Hence, in binarizing the phase distribution $P(r)$ to obtain $B(r)$, based on the expression (13), the threshold value PTH thereof is set as $$PTH = 2\sin^{-1}\sqrt{\frac{I(r)}{I_{max}}} \tag{14}$$

In producing a binary phase holography with the phase difference distribution $B(r)$ binarized as described above in order to pseudo-realize of the phase difference distribution $P(r)$, the value of the phase difference distribution $B(r)$ is set so as to fulfill the expressions (7)a, (7)b and (14). Hence, the phase difference distribution $B(r)$ is obtained by $$B(r) = \pi (PTH \leq P(r) < 2\pi) \tag{15)a}$$

or by $$B(r) = 0 (0 \leq P(r) < PTH) \tag{15)b}$$

where $PTH = 2\sin^{-1}\sqrt{\frac{I(r)}{I_{max}}}$

FIG. 3 shows the phase difference distribution $B(r)$ graphically shown based on the expression (15)a or (15)b. In order to realize the phase difference distribution $B(r)$, a height $H(r)$ of the convex portion at a coordinate r is obtained by $$H(r) = \frac{\lambda}{n-1} \quad (B(r) = \pi) \tag{16)a}$$

or by $$H(r) = 0 \quad (B(r) = 0) \tag{16)b}$$

Subsequently, the diffraction efficiency distribution $\eta(r)$ will be described. As described above, in this embodiment, the diffraction efficiency distribution $\eta(r)$ of the diffraction grating shown in FIGS. 6A and 6B performs the function of the intensity distribution $I(r)$ of the binary holographic device 1 of FIG. 1.

For simplicity, the displacement of r is set to $$0 \leq r < d \tag{17}$$

$P(r)$ to be pseudo-realized shown in the $P(r)$-r graph of FIG. 3 is given within the range of the expression (17) by an approximation of the following expression:

$$P(r) = \frac{2\pi r}{d} \tag{18}$$

Assuming that the expression (18) and the expression (14) are equal to each other, the coordinate r at which $P(r)$ and PTH intersect is $$P(r) = \frac{2\pi r}{d} = 2\pi - \tag{19}$$

$$2\sin^{-1}\sqrt{\frac{I(r)}{I_{max}}} = PTH \therefore r = d\left(1 - \frac{\sin^{-1}\sqrt{\frac{I(r)}{I_{max}}}}{\pi}\right)$$

$$a(r) = d - r = \tag{20}$$

$$\frac{d\sin^{-1}\sqrt{\frac{I(r)}{I_{max}}}}{\pi} \therefore \frac{a(r)}{d} = \frac{\sin^{-1}\sqrt{\frac{I(r)}{I_{max}}}}{\pi}$$

Since the expression (20) coincides with the previously described expression (13), a desired diffraction efficiency distribution $\eta(r)$ is realized. Since the same holds at coordinates other than those fulfilling the expression (17), a description thereof will be omitted.

That is, when PTH is as defined by the expression (14), the upper surface width $a(r)$ of a convex portion formed in one pitch of the diffraction grating located at a coordinate r which is an intersection of PTH and $P(r)$ is a distance from the coordinate r to a coordinate d, and the height of the convex portion formed in one pitch of the diffraction Grating is $H(r)$ obtained by the expressions (16)a and (16)b, the diffraction efficiency distribution $\eta(r)$ and the binarized phase distribution $B(r)$ are precisely realized.

In the process, the resist film FI having a thickness h (=$\lambda/(n-1)$) is prepared, and to form the surface configuration shown in the $H(r)$-r graph of FIG. 3, the convex portions with a height $H(r)$=h are formed by removing portions where the height $H(r)$ is to be $H(r)$=0 to form concave portions so that the calculated distribution $a(r)$ of the upper surface width of one pitch of the diffraction grating located at a coordinate r is provided.

Second Embodiment

Another embodiment of the present invention employing a blazed holography will be described.

Figure 4:
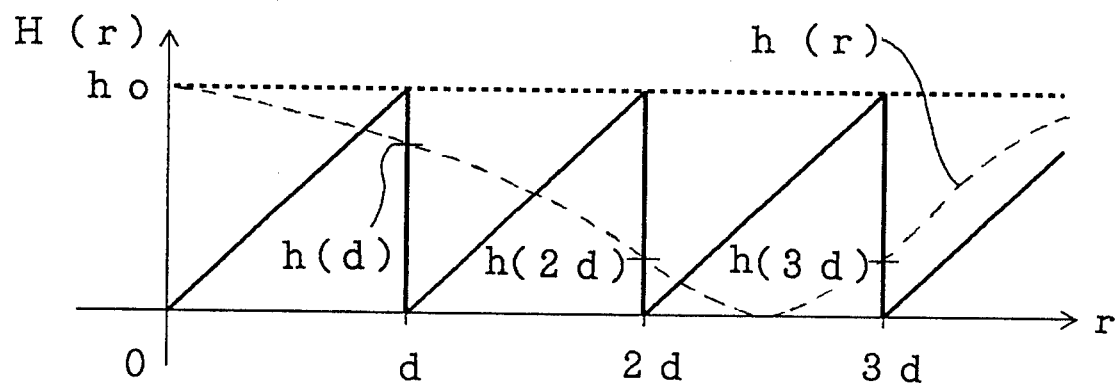
FIG. 4 is a view showing a cross-sectional configuration of a blazed holographic device.

FIG. 4 shows a surface configuration $H(r)$ of a saw-toothed blazed holography where a phase difference distribution to be provided to incident light waves is formed to Give a relative value between [0, $2\pi$].

In FIG. 4, an original point 0 is an intersection of the zone plate 4 and the optical axis 5 shown in FIG. 2, the horizontal axis represents a coordinate r on the zone plate 4, and the vertical axis represents a height $H(r)$ of saw-toothed portions formed on the surface of the zone plate 4.

At this time, the saw-toothed portions are formed so that a peak height ho thereof is $$ho = \frac{\lambda}{n-1} \tag{21}$$

The coordinate interval between each peak is a constant value, i.e. a pitch d.

Figure 7:
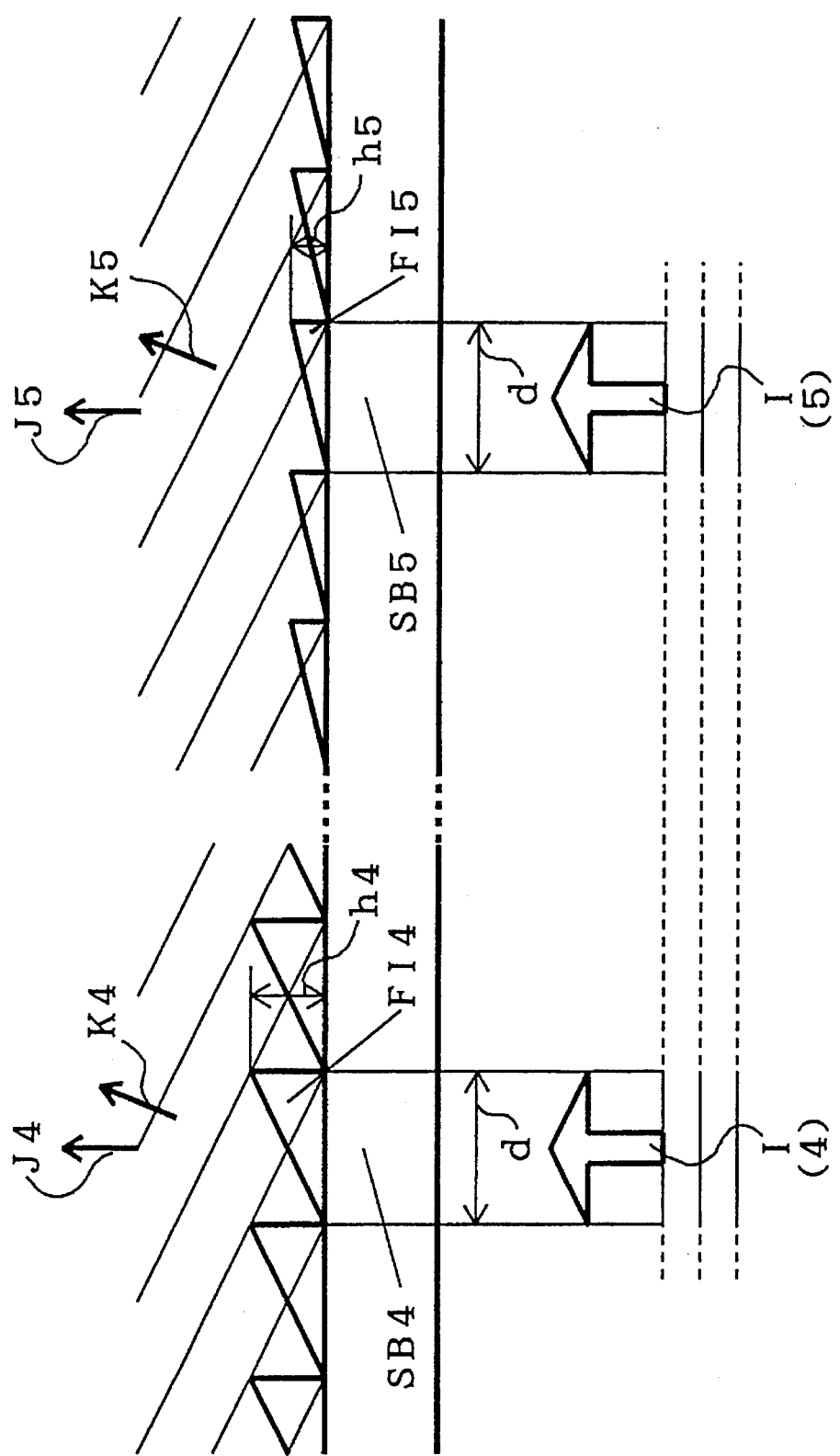
FIG. 7 is a cross-sectional view of the blazed holographic device embodying the present invention.

FIG. 7 shows a cross-sectional view of a blazed holography where the peak height of the saw-toothed portions is provided with a distribution. The diffraction efficiency thereof will be described.

As shown in FIG. 7, saw-toothed portions FI4 and FI5 are formed on glass plates SB4 and SB5. The saw-toothed portions FI4 and FI5 perform the function of a diffraction grating by diffracting light rays incident on the pitch d with an intensity I at a predetermined diffraction angle and outputting diffracted rays K4 and K5. Thus, a phase difference distribution and the intensity distribution I(r) are realized with these saw-toothed portions serving as a diffraction grating.

That is, luminous fluxes having an intensity I are incident on the pitch d at portions (4) and (5) and transmitted. After diffraction, transmitted light rays having intensities J4 and J5, respectively, and diffracted light rays having intensities K4 and K5, respectively, are outputted. At this time, it is assumed that at the portion (4)

$$h5 < h4 \leq ho \tag{22}$$

and at the portion (5)

$$0 \leq h5 < h4 \tag{23}$$

where h4 and h5 respectively represent peak heights of the saw-toothed portions FI4 and FI5 formed on the glass plates SB4 and SB5 at the portions (4) and (5).

The diffraction efficiencies at the portions (4) and (5) are given by K4/I and K5/I, respectively. As described later (expression (24)), at the portion (4) where the expression (22) holds, the diffraction efficiency thereof given by K4/I is larger than the diffraction efficiency given by K5/I at the portion (5) where the expression (23) holds. Thus, the intensity distribution I(r) of the diffracted light ray at the portion (4) is larger than the intensity distribution I(r) of the diffracted light ray at the portion (5).

That is, the portion (5) performs the function of the portions 1a of the conventional amplitude modulation holographic device 1 of FIG. 1 having a small amplitude distribution, while the portion (4) performs the function of the portions 1b having a large amplitude distribution. Thus, with this blazed holography, it is also possible to omit the high-cost, difficult process of joining the amplitude modulation holographic device 1 and the phase modulation holographic device 2.

Subsequently, it will be specifically described that in the blazed holography shown in FIG. 7, the phase difference distribution and the intensity distribution I(r) can simultaneously be realized by forming the saw-toothed portion located at a coordinate r so as to have a peak height h(r) which is precisely calculated.

First, in order to realize a diffraction efficiency distribution η(r), the surface configuration of the blazed holographic device is calculated in the following manner.

The diffraction efficiency η(r) when the peak height h(r) (0<h(r)<ho) of the saw-toothed portions is provided is obtained by $$\eta(r) = C \times \frac{1 - \cos\left(\frac{\pi h(r)}{ho}\right)}{2} \tag{24}$$

where C is a constant.

That is, the larger and the closer to ho the peak height h(r) of the saw-toothed portions is, the larger the diffraction efficiency distribution η(r) is, and the diffraction efficiency distribution η(r) is a maximum value ηmax when h(r)=ho.

Hence, the following expression holds:

$$\frac{\eta(r)}{\eta\max} = \frac{1 - \cos\left(\frac{\pi h(r)}{ho}\right)}{2} \tag{25}$$

Substituting the expression (25) with respect to the peak height h(r) of the saw-toothed portions in order to obtain a desired diffraction efficiency distribution η(r), $$h(r) = \left(\frac{ho}{\pi}\right) \cos^{-1}\left(1 - \frac{2\eta(r)}{\eta\max}\right) \tag{26}$$

Figure 5:
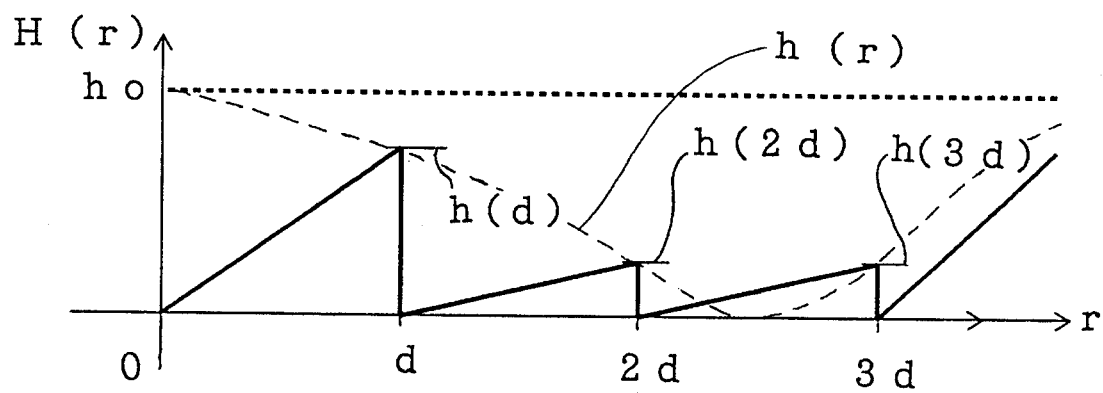
FIG. 5 is a view showing a cross-sectional configuration of a blazed holographic device embodying the present invention.

By modulating the surface configuration H(r) of the saw-toothed portions as shown in FIG. 5 so as to have the peak height h(r) provided by the expression (26) and processing the surface in accordance therewith, a blazed holography having the diffraction efficiency η(r) can be produced.

In FIG. 5, the original point 0 is an intersection of the zone plate 4 and the optical axis 5 shown in FIG. 2, the horizontal axis represents the coordinate r on the zone plate 4, and the vertical axis represents the height H(r) of the saw-toothed portions formed on the zone plate 4.

In the present invention, the diffraction efficiency distribution η(r) provided to the blazed holography having the phase distribution performs the function of the intensity distribution I(r) of the binary phase holographic device 1 of FIG. 1 for providing amplitude distribution modulation.

Moreover, while a transmission holography is used in the above embodiments, when a reflection holography is used, with a similar structure, it is also possible to provide to an incident wavefront a phase distribution and an amplitude distribution in accordance with a diffraction efficiency distribution by use of one holographic device.

Further, in the case of the binary holographic device, while in the above-described embodiments, a distribution is provided to the diffraction efficiency by varying the widths of the convex portions on its cross section, a distribution may be provided to the diffraction efficiency by varying the heights of the convex portions. Moreover, in the case of the blazed holographic device, while in the above-described embodiments, a distribution is provided to the diffraction efficiency by varying the peak heights of the saw-toothed portions, a distribution may be provided to the diffraction efficiency by varying the widths of the saw-toothed portions.

Obviously, many modifications and variations of the present invention are possible in light of the above teachings. It is therefore to be understood that within the scope of the appended claims, the invention may be practiced other than as specifically described.

What is claimed is:

1. A phase modulating device, comprising:
    a substrate having a binarized surface configuration defined by the following equations:

$B(r) = \pi (PTH(r) \leq P(r) < 2\pi)$ or $B(r) = 0 (0 \leq P(r) < PTH(r))$ $PTH(r) = 2 \sin^{-1} \eta(r)^{-\frac{1}{2}}$ wherein P(r) is the phase difference distribution and B(r) is the binarized surface configuration at coordinate r along a diameter of the substrate, η(r) is a diffraction efficiency distribution, and PTH(r) is a threshold value for binarization.

2. A binary type phase modulating device as claimed in claim 1, wherein the substrate has a plurality of rectangular protrusions, heights of which are defined by the following equations:

$H(r)=\lambda/(n-1)(B(r)=\pi)$ or $H(r)=0(B(r)=0)$ wherein H(r) is the height of the rectangular protrusion, λ is a wavelength of the incident light, and n is a refractive index of the rectangular protrusion.

3. A phase modulating device, comprising:

a substrate having a plurality of sawtoothed protrusions defined by the following equation:

$h(r)=(ho/7r)\cos^{-1}(1-2\eta(r)/\eta max)$ wherein h(r) is the configuration of the sawtoothed protrusion, ho is the peak height of the sawtoothed protrusion, η(r) is a diffraction efficiency distribution necessary for generating two wavefronts when a coherent light is incident on the substrate, and η max is the maximum value of η(r).

4. A phase modulating device, comprising:

a single substrate having a surface configuration, with a diffraction efficiency distribution modulated by a predetermined amplitude distribution, which provides an incident coherent light with a phase difference distribution and the predetermined amplitude distribution in accordance with the diffraction efficiency distribution, said amplitude distribution being defined so that the incident light provided with both of the phase difference distribution and the amplitude distribution generates two wavefronts.

5. A phase modulating device as claimed in claim 4, wherein the phase modulating device is of a binary type having a plurality of rectangular protrusions and the diffraction efficiency distribution is obtained by varying a width of each rectangular protrusion.

6. A phase modulating device as claimed in claim 4, wherein the phase modulating device is of a binary type having a plurality of rectangular protrusions and the diffraction efficiency distribution is obtained by varying a height of a peak of each rectangular protrusion.

7. A phase modulating device as claimed in claim 4, wherein the phase modulating device is of a blazed type having a plurality of sawtoothed protrusions and the diffraction efficiency distribution is obtained by varying a height of a peak of each sawtoothed protrusion.

8. A phase modulating device as claimed in claim 4, wherein the phase modulating device is of a blazed type having a plurality of sawtoothed protrusions and the diffraction efficiency distribution is obtained by varying a width of each sawtoothed protrusion.

9. A phase modulating device, comprising:

a single substrate having a surface configuration which provides an incident coherent light with a phase difference distribution and a predetermined amplitude distribution, said amplitude distribution being defined so that the incident light provided with both of the phase difference distribution and the amplitude distribution generates two wavefronts.

10. A phase modulating device as claimed in claim 9, wherein the phase modulating device is of a binary type having a plurality of rectangular protrusions, each width of which is varied for providing the incident light with the amplitude distribution.

11. A phase modulating device as claimed in claim 9, wherein the phase modulating device is of a blazed type having a plurality of sawtoothed protrusions, each peak light of which is varied for providing the incident light with the amplitude distribution.

12. A phase modulating device which provides an incident coherent light with a phase difference distribution, comprising:

a substrate having a diffraction efficiency distribution modulated by a predetermined amplitude distribution to be provided on the incident light, said amplitude distribution being defined so that the incident light provided with both of the phase difference distribution and the amplitude distribution generates two wavefronts.

13. A phase modulating device, consisting of:

a single substrate having an incident surface; and a film layer deposited on the incident surface and configured to have a predetermined series of spaced protrusions to provide a surface configuration on the incident surface having a diffraction efficiency distribution modulated by a predetermined amplitude determination, which thereby provides an incident coherent light with a phase difference distribution and the predetermined amplitude distribution in accordance with the diffraction efficiency distribution, said amplitude distribution being further defined so that an incident light provided with the same phase difference distribution and the amplitude distribution generates two wavefronts.

* * * * *